United States Patent [19]

Das

[11] Patent Number: 4,760,110

[45] Date of Patent: Jul. 26, 1988

[54] PROCESS FOR PREPARING ANIONIC ACRYLIC LATEX COMPOSITIONS

[75] Inventor: Suryya K. Das, Pittsburgh, Pa.

[73] Assignee: PPG Industries, Inc., Pittsburgh, Pa.

[21] Appl. No.: 34,448

[22] Filed: Apr. 6, 1987

[51] Int. Cl.[4] ............................ C08F 2/16; C08F 20/54
[52] U.S. Cl. .................................... 524/460; 524/521;
524/533; 524/555; 524/812; 526/312
[58] Field of Search ............... 524/460, 521, 533, 555,
524/812; 526/312

[56] References Cited

U.S. PATENT DOCUMENTS

| | | | |
|---|---|---|---|
| 3,356,627 | 12/1967 | Scott | 260/29.6 |
| 3,853,803 | 12/1974 | Anderson et al. | 524/812 |
| 3,957,710 | 5/1976 | Rohmann et al. | 526/312 |
| 4,172,177 | 10/1979 | Sato | 428/413 |
| 4,339,365 | 7/1982 | Becher et al. | 523/400 |
| 4,357,440 | 11/1982 | Schreck | 524/535 |
| 4,440,897 | 3/1984 | Maska | 524/460 |

*Primary Examiner*—Joseph L. Schofer
*Assistant Examiner*—Peter D. Mulcahy
*Attorney, Agent, or Firm*—Godfried R. Akorli

[57] ABSTRACT

Disclosed herein is an improved process for preparing anionic acrylic latex composition which contains copolymers containing effective amounts of acid groups and amino groups.

4 Claims, No Drawings

PROCESS FOR PREPARING ANIONIC ACRYLIC LATEX COMPOSITIONS

FIELD OF THE INVENTION

This present invention relates to anionic acrylic latices and more specifically a method of preparing anionic acrylic latex compositions containing amino groups.

BACKGROUND OF THE INVENTION

Incorporation of an amine functional monomer in a latex composition during anionic polymerization is difficult. The amine acts as a free radical scavenger to inhibit polymerization. Even at low concentrations of the amine (at pH of less than 7, which is normally the case in anionic persulfate initiated polymerizations), there can be created cationic polymeric species which cause coagulation or flocculation of the anionic polymeric species. Because of this, it is difficult to synthesize an amine functional anionic emulsion polymer with good stability and conversion.

By this invention, there is provided a means for preparing stable and coagulum free anionic latex compositions containing carboxyl and amine functional monomers.

SUMMARY OF THE INVENTION

In accordance with the foregoing, the present invention encompasses an improved process for preparing an anionic acrylic latex composition by copolymerizing ethylenically unsaturated monomers which contain an acid group and amino group under conditions of free-radical initiated addition polymerization in an aqueous medium in the presence of an emulsifier, the improvement comprising:
  (i) copolymerizing the monomer containing the acid group with another copolymerizable monomer which is substantially free of an amino group, followed by
  (ii) raising the pH of the resultant copolymer by adding a base thereto in an amount sufficient to avoid coagulation of the latex composition in the presence of the amino group containing monomer, followed by
  (iii) copolymerizing, in the same aqueous medium, the monomer containing amino group with another copolymerizable monomer which is substantially free of a carboxyl group.

DETAILED DESCRIPTION OF THE INVENTION

In copolymerizing the monomer containing the carboxyl group, there can be employed art-known emulsion polymerization techniques wherein ethylenically unsaturated monomers, as described herein below are subjected to free-radical initiated addition polymerization in an aqueous medium in the presence of an emulsifier. The ethylenically unsaturated monomer which is essential to this stage of polymerization (hereinafter referred to as "first stage polymerization") is an acid group containing monomer, or a precursor thereof. Other copolymerizable monomers employed therewith should be such that they do not adversely affect the preparation or performance of the resultant latex. Illustratively, the copolymerizable monomers should be free of, or substantially free of, an amino group.

The acid group containing monomers which are typically carboxyl group-containing monomers are preferably acrylic acid and methacrylic acid. Other carboxyl group-containing monomers useful herein can be crotonic acid, maleic acid or its anhydride, fumaric acid or itaconic acid are also useful herein. Usually, when the other carboxyl group-containing monomers are used in combination with acrylic or methacrylic acids.

The composition of the carboxyl group-containing monomer will depend on the particular end use of the latex composition. Typically, the carboxyl group-containing monomer is employed in an amount of 10 to 0.5 and preferably, 5 to 1 percent by weight based on the total weight of the monomers.

Among such other known polymerizable ethylenically unsaturated compounds which can be copolymerized are the alkenyl-aromatic compounds, i.e., the styrene compounds, the derivatives of ethylenically unsaturated acids such as the acrylic esters, acrylic nitriles, maleic esters, and unsaturated alcohol esters, and unsaturated ketones, unsaturated ethers, and other compounds containing one or more ethylenic linkages capable of addition polymerization. Specific examples of such ethylenically unsaturated compounds are styrene, alpha-methylstyrene, vinyl-naphthalene, monochlorostyrene and dichlorostyrene; methyl methacrylate, ethyl acrylate, acrylonitrile, methacrylonitrile, ethyl maleate, vinyl acetate, vinyl methyl ketone, 1,3-butadiene, isoprene, acrylamide and its derivatives, vinyl chloride, and the like.

The emulsifiers useful herein are anionic surfactants preferably water-soluble anionic surfactants. The amount of surfactant which is used varies primarily with regard to the type of the surfactant the selection of the monomers, and the relative proportions of the monomers. Generally, the total amount of surfactant is between 0.1 to 10 percent by weight based on total weight of the monomers and preferably within the range of 0.5 to 5 percent by weight based on the total weight of the monomers. The surfactants useful herein can be sulfates, sulfonates, phosphates and carboxylates.

The free radical polymerization initiators useful herein are a water-soluble types. Examples include peroxides such as hydrogen peroxide, and ionic types such as ammonium, sodium and potassium persulfates, which are preferred. The amount of initiator which is employed depends somewhat on the nature of the monomers selected including impurities which may accompany the particular monomers. However, the usual range for free radical initiator is about 0.01 to 3 and preferably 0.05 to 1 percent by weight based on total weight of the monomers.

Examples of the free radical emulsion polymerization techniques which can be employed are continuous and semi-continuous monomer feed, pr-emulsification and seeding techniques.

The resultant carboxyl group-containing copolymer would have a relatively low pH in the range of about 2 to 4. In accordance with this invention, a base is added to the latex composition in an amount sufficient to prevent coagulation thereof upon subsequent addition of amino group-containing monomers. This stage of the preparation of the latex composition is referred to herein as the "intermediate stage". Generally put, the base is added in an amount sufficient to avoid coagulation of the latex composition in the presence of an amino group-containing monomer as described herein. More specifically, the base is added in an amount sufficient to raise the pH of the latex composition to a range of about 5 to 9. The useful bases are preferably water soluble and volatile bases such as ammonia, dimethylethanol amine, triethylamine, or diisopropalamine. Other bases such as alkali metal hydroxides can also be used but they are not preferred because of associate problems of water sensitivity.

Following the addition of the base, an amino group-containing monomer is copolymerized with other co-polymerizable monomers, in the existing aqueous medium of the latex composition. This stage of the preparation of the latex composition is referred to herein as "second stage polymerization".

The amino group-containing monomers of the invention can be selected from a broad class of monomers. It is noteworthy that both water-soluble and water-insoluble amine group-containing monomers can be employed with good conversion without coagulation. Illustrative, but non-limiting, examples of the amino group containing monomers that are useful herein can be tertiary-butylaminoethyl (meth)acrylate, diethylaminoethyl (meth)acrylate, and dimethylaminoethyl (meth)acrylate. The amino group containing monomer can be employed in effective amounts which depend on the particular end use of the latex composition. The amino group containing monomers can be employed in amounts ranging from about 1 to 25 and preferably 3 to 5 percent by weight based on the total weight of the monomers.

It is also a distinct feature of the invention that there can be employed in raising the pH of the latex composition at the intermediate stage, a broad class of bases. It is noteworthy that organic amines such as diethanolamine, triethylamine, diisopropanol amine can be employed.

The resultant latex composition comprises copolymers containing amino groups and carboxyl group in effective concentrations, and can have a high resin solids content of about 45 to 60 percent. With the effective carboxyl and amino group, the latex composition has been found to be particularly suited to use as coating with improved adhesion properties and other desirable film properties, on a variety of substrates.

The latex composition prepared by the process described above can be mixed with a minor amount, that is, up to 20 percent by weight based on total weight of the latex composition, of thickening agents, anti-foaming agents, preservatives, plasticizers and stabilizers such as nonionic surfactants and colloidal stabilizers if desired.

The latex composition can be made thermosetting in nature by the presence of curing agents. The curing agents can be an integral part of the polymer or they can be external to the polymer.

Curing agents which are integral with the acrylic polymer are as described in U.S. Pat. No. 4,166,882, column 3, line 37, to column 4, line 2, incorporated herein by reference, which discloses curing agents which are an integral part of an acrylic polymer which are prepared by including within the monomer charge polymerizable ethylenically unsaturated monomers containing a self-curing group such an N-methylol ether derivatives of acrylic and methacrylic amides. External curing agent can also be used. These curing agents can be aminoplasts as disclosed in U.S. Pat. No. 4,166,882, column 4, line 50, to column 5, line 28, incorporated herein by reference, or blocked isocyanates as disclosed in U.S. Pat. No. 3,984,299, column 1, line 57, to column 3, line 15.

Pigmented composition can be prepared with pigments which may be any of the conventional types comprising, for examples, iron oxides, lead oxides, strontium chromate, carbon black, coal dust, titanium dioxide, talc, barium sulfate, as well as color pigments such as cadmium yellow, cadmium red and chromium yellow.

The pigment content of the composition is usually expressed as the pigment-to-resin weight ratio. In the practice of the present invention, the pigment-to-resin weight ratios are as high as 2:1, for most pigment coatings, are within the range of 0.5 to 1:1.

The latex composition of the present invention, including pigmented latex composition is stable, that is, it is non-sedimenting when stored at 10° to 30° C. If any sediment forms, it is the type which can be redispersed with mild agitation. The latex composition and the coating compositions derived therefrom, have been found to provide films having good wet appearance, adhesion when applied to substrates and which additionally have properties of durability, corrosion resistance and excellent appearance, upon cure.

Having generally described the features of this invention, the following examples are given to illustrate more fully to those skilled in the art, the practice of this invention without intending any limitations thereby. All parts and percentages are by weight unless otherwise indicated.

EXAMPLE 1

The following example shows the preparation of the anionic acrylic latex composition of this invention.

| Reactor Charge | |
|---|---|
| Ingredients | Parts by Weight |
| Deionized water | 1004.3 |
| 0.125% Sodium bicarbonate | 2.1 |
| 50% Feed C | 485.5 |
| Feed A | |
| 0.75% Ammonium persulfate | 12.8 |
| Deionized water | 25.0 |
| Feed B | |
| Butyl methacrylate | 769.5 |
| Styrene | 513.0 |
| Ethylhydroxy acrylate | 290.7 |
| Methyl methacrylate | 85.5 |
| Feed X | |
| Feed B-1 | 50.0 |
| Feed C | |
| 0.5% Sodium dodecyl benzene sulfonate | 35.3 |
| Deionized water | 936.3 |
| Feed D | |
| TRITON 101[1] | 34.2 |
| Feed B-1 | |
| 3% Acrylic acid | 51.3 |
| 50% of Feed B | 829.4 |
| 25% of Feed C | 242.9 |
| 50% of Feed D | 17.1 |
| Rinse | |
| Deionized water | 50.0 |
| Feed B-2 | |
| 4% t-butylaminoethyl methacrylate | 68.8 |
| 1% Hydroxyethyl methacrylate | 17.1 |
| 50% of Feed B | 829.4 |
| 25% of Feed C | 242.9 |
| 50% of Feed D | 17.1 |
| Rinse | |
| Deionized water | 50.0 |
| Feed E | |
| Ammonium hydroxide | 22.0 |
| Feed F | |

[1]Nonylphenoxy polyoxyethanol available from Rohm and Haas Co.

| Reactor Charge | |
|---|---|
| Ingredients | Parts by Weight |
| Dimethylethanol amine | 22.0 |
| Deionized water | 22.0 |
| *Feed G* | |
| FOAMASTER[1] | 12.2 |

[1] A defoamer available from Diamond Shamrock Co.

The reactor charge was heated to 80°–85° C. under a nitrogen blanket, while Feed B was being pre-emulsified. Feed X was added to the reactor charge which was held for 2 minutes, followed by addition of Feed A. The reaction mixture was held for 30 minutes at 82° C. Feed B-1 was then added over a period of 90 minutes and rinsed. With the addition of Feed B-1 completed, pH of the rection mixture was 2.1. Feed E was added and the reaction mixture was held at 83° C. for 30 minutes. The resultant composition had a pH of 5.61. Thereafter Feed B-2 was added slowly over a period of 90 minutes and rinsed. With the addition of Feed B-2 completed, the resultant composition was held for two hours, cooled and Feeds F and G were added.

The resultant latex had a pH of 8.87, a solids content of 45.6 percent, particle size was 120 nm and viscosity of 212 centipoise measured with a number 2 spindle 50 revolutions per minute (rpm).

The above latex was formulated into a water-based coating composition which was applied on a substrate already coated with an alkyd paint. The coating composition of this invention upon air-drying exhibited excellent wet-adhesion. Wet adhesion was evaluated by scribing the coating of this invention, covering the scribed coating with a wet towel for 30 minutes, removing the towel and blotting the excess water with a dry paper towel, applying an adhesive tape to the scribed surface and pulling off the tape. In the instance of the coatings of this invention little or no coatings were pulled off.

EXAMPLE 2

Preparation of a coating composition of this invention:

A pigment paste was prepared by combining 15 parts by weight of propyl carbitol, 5 parts by weight of propoxy propanol available from Union Carbide as PROPOSAL P, 50 parts by weight of water, 11 parts by weight of dispersant, 2 part by weight of a defoamer and mixing the same until the resultant mixture was free of lumps. 2.50 parts by weight of a synthetic acrylic thickening agent, 185 parts by weight of titanium dioxide pigment and about 55 parts by weight of water were mixed and ground to a Hegman Scale of about 8.

The above pigment paste was let down with 513 parts by weight of the acrylic latex of this invention, about 114 parts by weight of water, 9 parts by weight of a foam control agent, 20 parts by weight of coalescing solvent, 15 parts by weight coupling solvent, 4 parts by weight of a biocide/mildewcide, 20 parts by weight of a synthetic urethane thickener.

The resultant coating having a non-volatile content of 45.3 percent by weight solids was applied to a substrate as follows. The above coating was brushed over a substrate which had been painted with an alkyd based paint. The dried paint was scribed and evaluated for adhesion as previously described. In this instance as well, little or no dried paint was pulled off, thus showing that the latex compositions of this invention have excellent wet adhesion.

The following examples further illustrate the process for preparing the latex compositions of this invention.

EXAMPLE 3

The following example shows the preparation of the anionic acrylic latex composition of this invention wherein the amino group-containing monomer is diethylaminoethyl methacrylate.

| Reactor Charge | |
|---|---|
| Ingredients | Parts by Weight |
| Deionized water | 1004.3 |
| 0.125% Sodium bicarbonate | 2.1 |
| 50% Feed C | 485.5 |
| *Feed A-1* | |
| 0.375% Ammonium persulfate | 6.4 |
| Deionized water | 12.5 |
| *Feed X* | |
| Feed B-1 (Pre-emulsion) | 50.0 |
| *Feed C* | |
| Deionized water | 936.3 |
| Sodium dodecylbenzene sulfonate | 35.3 |
| *Feed B* | |
| 45% Butyl methacrylate | 769.5 |
| 30% Styrene | 513.0 |
| 17% 2-ethylhexyl acrylate | 290.7 |
| 5% Methyl methacrylate | 85.5 |
| *Feed D* | |
| 2% TRITON 101 | 34.2 |
| *Feed B-1* | |
| 3% Acrylic acid | 51.3 |
| 50% of Feed B | 829.4 |
| 25% of Feed C | 242.9 |
| 50% of Feed D | 17.1 |
| *Rinse* | |
| Deionized water | 50.0 |
| *Feed B-2* | |
| 4% Diethylaminoethyl methacrylate | 68.8 |
| 1% Hydroxyethyl methacrylate | 17.1 |
| 50% of Feed B | 829.4 |
| 25% of Feed C | 242.9 |
| 50% of Feed D | 17.1 |
| *Rinse* | |
| Deionized water | 50.0 |
| *Feed A-2* | |
| 0.375% Ammonium persulfate | 6.4 |
| Deionized water | 12.5 |
| *Feed E* | |
| Ammonium hydroxide | 24.0 |
| *Feed F* | |
| Dimethylethanol amine | 22.0 |
| Deionized water | 22.0 |

The reactor charge was heated to 80°–85° C. under a nitrogen blanket, while B-1 was being pre-emulsified. Feed X was added to the reactor charge and held for about 2 minutes at 85+ C. followed by addition of Feed A-1. The reaction mixture was held for 30 minutes at 83° C. Thereafter, Feed B-1 was added slowly over a period of 90 minutes while Feed B-2 was being pre-emulsified. With the addition of Feed B-1 completed and rinsed, the reaction mixture was held at 83° C. for 30 minutes. The resultant composition having a pH of about 2.3 had Feed E added thereto with a pH increase to 6.5. Thereafter, Feeds B-2 and A-2 were added simultaneously over a period of 90 minutes, over a temperature range of 80°–85° C. Feed B-2 was rinsed and the resultant composition was held for 2 hours, over a temperature range of 80°–85° C. and then cooled. Feeds F and G were then added and the final composition was filtered and analyzed. pH was 8.9, resin solids was 46.5 and viscosity was 1310 centipoises, particle size was 121 nm.

EXAMPLE 4

The following example shows the preparation of the anionic acrylic latex composition of this invention wherein the base employed at the intermediate stage was triethylamine.

| Reactor Charge | |
|---|---|
| Ingredients | Parts by Weight (Grams) |
| Deionized water | 1004.3 |
| 0.125% Sodium bicarbonate | 2.1 |
| 50% Feed C | 485.5 |
| Feed A | |
| 0.75% Ammonium persulfate | 12.8 |
| Deionized water | 25.0 |
| Feed X | |
| Feed B-1 (Pre-emulsion) | 50.0 |
| Feed C | |
| 0.5% Sodium dodecylbenzene sulfonate | 35.3 |
| Deionized water | 936.3 |
| Feed B | |
| 45% Butyl methacrylate | 769.5 |
| 30% Styrene | 513.0 |
| 17% 2-ethylhexyl acrylate | 290.7 |
| 5% Methyl methacrylate | 85.5 |
| Feed B-1 | |
| 3% Acrylic acid | 51.3 |
| 50% of Feed B | 829.4 |
| 25% of Feed C | 242.9 |
| 50% of Feed D | 17.1 |
| Rinse | |
| Deionized water | 50.0 |
| Feed D | |
| 2% TRITON 101 | 34.2 |
| Feed B-2 | |
| 4% t-butylaminoethyl methacrylate | 68.8 |
| 1% Hydroxyethyl methacrylate | 17.1 |
| 50% of Feed B | 829.4 |
| 25% of Feed C | 242.9 |
| 50% of Feed D | 17.1 |
| Rinse | |
| Deionized water | 50.0 |
| Feed E | |
| Triethylamine | 43.5 |
| Feed F | |
| Dimethylethanol amine | 22.0 |
| Deionized water | 22.0 |
| Feed G | |
| FOAMASTER | 12.2 |

The reactor charge was heated to 80°-85° C. under a nitrogen blanket, while Feed B-1 was being emulsified. Feed X was added to the reactor charge and held for about 2 minutes at 85° C., followed by addition of Feed A. The reaction mixture was held for 30 minutes at 83° C. Thereafter, Feed B-1 was added slowly over a period of 90 minutes while Feed B-2 was being pre-emulsified. With the addition of Feed B-2 completed (with a rinse), the reaction mixture was held at 83° C. for 30 minutes. Thereafter Feed E was added to the resultant composition with a consequential pH change from 2.7 to 6.1. With the addition of Feed E completed, Feed B-2 was added over a period of 90 minutes and then rinsed. The resultant composition was held for 2 hours over 80°-85° C. and cooled. Feeds F and G were then added. The final composition was filtered and analyzed. pH was 8.7, resin solids was 45.5 percent and viscosity was 316 centipoise, with a number 2 spindle at 50 rpm.

EXAMPLE 5

The following example shows the preparation of the anionic acrylic latex composition of this invention wherein the base employed at the intermediate stage was dimethyl ethanolamine.

| Reactor Charge | |
|---|---|
| Ingredients | Parts by Weight (Grams) |
| Deionized water | 1004.3 |
| 0.125% Sodium bicarbonate | 2.1 |
| 50% Feed C | 485.5 |
| Feed A | |
| 0.75% Ammonium persulfate | 12.8 |
| Deionized water | 25.0 |
| Feed X | |
| Feed B-1 (Pre-emulsion) | 50.0 |
| Feed C | |
| 0.5% Sodium dodecylbenzene sulfonate | 35.3 |
| Deionized water | 936.3 |
| Feed B | |
| 45% Butyl methacrylate | 769.5 |
| 30% Styrene | 513.0 |
| 17% 2-ethylhexyl acrylate | 290.7 |
| 5% Methyl methacrylate | 85.8 |
| Feed B-1 | |
| 3% Acrylic acid | 51.3 |
| 50% of Feed B | 829.4 |
| 25% of Feed C | 242.9 |
| 50% of Feed D | 17.1 |
| Rinse | |
| Deionized water | 50.0 |
| Feed D | |
| 2% TRITON 101 | 34.2 |
| Feed B-2 | |
| 4% t-butylaminoethyl methacrylate | 68.8 |
| 1% Hydroxyethyl methacrylate | 17.1 |
| 50% of Feed B | 829.4 |
| 25% of Feed C | 242.9 |
| 50% of Feed D | 17.1 |
| Rinse | |
| Deionized water | 50.0 |
| Feed E | |
| Dimethyl ethanolamine | 26.0 |
| Feed F | |
| Dimethylethanol amine | 22.0 |
| Deionized water | 22.0 |
| Feed G | |
| FOAMASTER | 12.2 |

The method of preparation was essentially the same as described in Example 1, with the following analytical results. pH was 8.4, resin solids was 44.6 percent and viscosity was 240 centipoises, with a number 2 spindle at 50 rpm.

EXAMPLE 6

The following example shows the preparation of the anionic acrylic latex composition of this invention wherein initiator continuous feed in the second stage polymerization provided better conversion.

| Reactor Charge | |
|---|---|
| Ingredients | Parts by Weight (Grams) |
| Deionized water | 1004.3 |
| 0.125% Sodium bicarbonate | 2.1 |
| 50% Feed C | 485.5 |
| Feed A-1 | |
| Ammonium persulfate | 6.4 |
| Deionized water | 12.5 |

-continued

| Reactor Charge | |
|---|---|
| Ingredients | Parts by Weight (Grams) |
| *Feed X* | |
| Feed B-1 (Pre-emulsion) | 50.0 |
| *Feed C* | |
| 0.5% Sodium dodecylbenzene sulfonate | 35.3 |
| Deionized water | 936.3 |
| *Feed B* | |
| 45% Butyl methacrylate | 769.5 |
| 30% Styrene | 513.0 |
| 17% 2-ethylhexyl acrylate | 290.7 |
| 5% Methyl methacrylate | 85.5 |
| *Feed D* | |
| 2% TRITON 101 | 34.2 |
| *Feed B-1* | |
| 3% Acrylic acid | 51.3 |
| 50% of Feed B | 829.4 |
| 25% of Feed C | 242.9 |
| 50% of Feed D | 17.1 |
| *Feed B-2* | |
| 4% t-butylaminoethyl methacrylate | 68.8 |
| 1% Hydroxyethyl methacrylate | 17.1 |
| 50% of Feed B | 829.4 |
| 25% of Feed C | 242.9 |
| 50% of Feed D | 17.1 |
| *Feed A-2* | |
| 0.187% Ammonium persulfate | 3.2 |
| Deionized water | 6.3 |
| *Feed E* | |
| Ammonium hydroxide | 22.0 |
| *Feed F* | |
| Dimethylethanol amine | 22.0 |
| Deionized water | 22.0 |
| *Feed G* | |
| FOAMASTER | 12.2 |

The method of preparation was essentially the same as described in Example 3, with the following analytical results: pH was 9.15, resin solids was 46.5 and viscosity was 1220 centipoises, with a number 3 spindle at 50 rpm.

EXAMPLE 7

The following example shows the preparation of the anionic acrylic latex composition of this invention wherein diisopropanol amine was employed as a base at the intermediate polymerization stage of the preparation.

| Reactor Charge | |
|---|---|
| Ingredients | Parts by Weight (Grams) |
| Deionized water | 1138.4 |
| 0.125% Sodium bicarbonate | 2.1 |
| 50% Feed C | 483.8 |
| *Feed A* | |
| 0.33% Ammonium persulfate | 5.6 |
| Deionized water | 25.0 |
| *Feed X* | |
| Feed B-1 (Pre-emulsion) | 50.0 |
| *Feed C* | |
| 0.26% Sodium dodecylbenzene sulfonate | 20.0 |
| Deionized water | 702.2 |
| *Feed B-1* | |
| 22.4% Methyl methacrylate | 382.7 |
| 22% Butyl methacrylate | 378.7 |
| 4% Hydroxyethyl methacrylate | 68.3 |
| 2% Acrylic acid | 34.2 |
| 33% Feed C | 238.3 |
| 50% Feed D | 17.1 |
| *Rinse* | |
| Deionized water | 50.0 |
| *Feed B-2* | |
| 21.4% Methyl methacrylate | 365.0 |
| 22% Butyl acrylate | 378.7 |
| 3% Hydroxyethyl methacrylate | 51.2 |
| 2.7% Tertiary-butylaminoethyl methacrylate | 46.2 |
| 1% Sodium dodacylbenzene sulfonate | 8.8 |
| 50% of Feed D | 17.1 |
| *Rinse* | |
| Deionized water | 50.0 |
| *Feed D* | |
| 2% TRITON 101 | 34.2 |
| *Feed E* | |
| Diisopropanol amine | 45.0 |
| *Feed I* | |
| 0.17% Ammonium persulfate | 2.9 |
| Deionized water | 100.0 |
| *Feed F* | |
| Diisopropanol amine | 40 |

The method of preparation was essentially the same as described in Example 1, with the following analytical result: pH was 7.98, resin solids was 44.25 percent and viscosity was 230 centipoises, with a number 3 spindle at 50 rpm.

COMPARATIVE EXAMPLE 1

The following example shows the preparation of the anionic acrylic latex composition in a manner similar to that of the present invention, except that a base was not employed at the intermediate stage of the preparation.

| Reactor Charge | |
|---|---|
| Ingredients | Parts by Weight (Grams) |
| Deionized water | 1004.3 |
| 0.125% Sodium bicarbonate | 2.1 |
| 50% Feed C | 485.5 |
| *Feed A* | |
| 0.75% Ammonium persulfate | 12.8 |
| Deionized water | 25.0 |
| *Feed X* | |
| Feed B-1 (Pre-emulsion) | 50.0 |
| *Feed C* | |
| 0.5% Sodium dodecylbenzene sulfonate | 35.3 |
| Deionized water | 936.3 |
| *Feed B* | |
| 45% Butyl methacrylate | 769.5 |
| 30% Styrene | 513.0 |
| 17% 2-ethylhexyl acrylate | 290.7 |
| 5% Methyl methacrylate | 85.5 |
| *Feed D* | |
| 2% TRITON 101 | 34.2 |
| *Feed F* | |
| Dimethylethanol amine | 22.0 |
| Deionized water | 22.0 |
| *Feed B-1* | |
| 3% Acrylic acid | 51.3 |
| 50% of Feed B | 829.4 |
| 25% of Feed C | 242.9 |
| 50% of Feed D | 17.1 |
| *Rinse* | |
| Deionized water | 50.0 |
| *Feed B-2* | |
| 4% t-butylaminoethyl methacrylate | 68.8 |
| 1% Hydroxyethyl methacrylate | 17.1 |
| 50% of Feed B | 829.4 |
| 25% of Feed C | 242.9 |
| 50% of Feed D | 17.1 |

Without the use of a base at the intermediate stage, there was a complete coagulation during addition of Feed B-1 comprising the amino monomer.

COMPARATIVE EXAMPLE 2

The following example shows the preparation of the anionic acrylic latex composition in a manner which was similar to that of the present invention, except that an insufficient amount of a base (5 parts by weight grams) was employed at the intermediate stage of the preparation.

| Reactor Charge | |
|---|---|
| Ingredients | Parts by Weight (Grams) |
| Deionized water | 1004.3 |
| 0.125% Sodium bicarbonate | 2.1 |
| 50% Feed C | 485.5 |
| Feed A | |
| 0.75% Ammonium persulfate | 12.8 |
| Deionized water | 25.0 |
| Feed X | |
| Feed B-1 (Pre-emulsion) | 50.0 |
| Feed C | |
| Deionized water | 936.3 |
| Sodium dodecylbenzene sulfonate | 35.3 |
| Feed D | |
| 2% TRITON 101 | 34.2 |
| Feed F | |
| Dimethylethanol amine | 22.0 |
| Deionized water | 22.0 |
| Feed E | |
| Ammonium hydroxide | 5.0 |
| Feed B | |
| Butyl methacrylate | 769.5 |
| Styrene | 513.0 |
| 2-ethylhexyl acrylate | 290.7 |
| Methyl methacrylate | 85.5 |
| Feed B-1 | |
| 3% Acrylic acid | 51.3 |
| 50% of Feed B | 829.4 |
| 25% of Feed C | 242.9 |
| 50% of Feed D | 17.1 |
| Rinse | |
| Deionized water | 50.0 |
| Feed B-2 | |
| 4% t-butylaminoethyl methacrylate | 68.8 |
| 1% Hydroxyethyl methacrylate | 17.1 |
| 50% of Feed B | 829.4 |
| 25% of Feed C | 242.9 |
| 50% of Feed D | 17.1 |
| Rinse | |
| Deionized water | 50.0 |

With an insufficient amount of a base, pH of the composition after the intermediate stage was 3.75. Addition of Feed B-2 containing an amino monomer resulted in complete coagulation of the latex composition.

EXAMPLE 8

The following example shows the preparation of the anionic acrylic latex composition in essentially the same manner as described in Example 1 with the exception that a reduced but sufficient amount of a base (10 parts by weight grams) was employed at the intermediate stage of the preparation.

| Reactor Charge | |
|---|---|
| Ingredients | Parts by Weight (Grams) |
| Deionized water | 1004.3 |

| -continued | |
|---|---|
| Reactor Charge | |
| Ingredients | Parts by Weight (Grams) |
| 0.125% Sodium bicarbonate | 2.1 |
| 50% Feed C | 485.5 |
| Feed A | |
| 0.75% Ammonium persulfate | 12.8 |
| Deionized water | 25.0 |
| Feed X | |
| Feed B-1 (Pre-emulsion) | 50.0 |
| Feed C | |
| Deionized water | 936.3 |
| Sodium dodecylbenzene sulfonate | 35.3 |
| Feed D | |
| 2% TRITON 101 | 34.2 |
| Feed B | |
| Butyl methacrylate | 769.5 |
| Styrene | 513.0 |
| 2-ethylhexyl acrylate | 290.7 |
| Methyl methacrylate | 85.5 |
| Feed B-1 | |
| 3% Acrylic acid | 51.3 |
| 50% of Feed B | 829.4 |
| 25% of Feed C | 242.9 |
| 50% of Feed D | 17.1 |
| Rinse | |
| Deionized water | 50.0 |
| Feed B-2 | |
| 4% t-butylaminoethyl methacrylate | 68.8 |
| 1% Hydroxyethyl methacrylate | 17.1 |
| 50% of Feed B | 829.4 |
| 25% of Feed C | 242.9 |
| 50% of Feed D | 17.1 |
| Rinse | |
| Deionized water | 50.0 |
| Feed E | |
| Ammonium hydroxide | 10.0 |
| Feed F | |
| Dimethyl ethanolamine | 22.0 |
| Deionized water | 22.0 |
| Feed G | |
| FOAMASTER | 12.2 |

The pH of the latex composition after the intermediate stage was 4.8. Addition of Feed B-2 containing an amino monomer did not cause flocculation or coagulation of the latex composition. The final latex composition has a pH of 8.1, resin solids of 45.4 percent and viscosity of 444 centipoises, with a number 2 spindle at 50 rpm.

The above specific illustration, and other descriptions herein, are not intended to limit the scope of the invention. Instead, it is intended that the invention include all variations and modifications falling within the scope of the appended claims.

Therefore, what is claimed is:

1. In an improved process for preparing an anionic acrylic latex composition by copolymerizing ethylenically unsaturated monomers which contain an acid group and an amino group under conditions of free-radical initiated addition polymerization in an aqueous medium in the presence of an anionic emulsifier, the improvement comprising:
   i. copolymerizing in an aqueous medium in the presence of a surfactant the monomer containing the acid group with another monomer which is substantially free of an amino group, followed by
   ii. raising the pH of the resultant copolymer by adding a base thereto in an amount sufficient to avoid coagulation of the latex composition in the presence of the amino group-containing monomer, followed by iii. copolymerizing in the same aqueous medium the monomer containing amino group with another copolymerizable monomer which is substantially free of a carboxyl group.

2. The proces of claim 1 wherein the acid group containing monomer is an acrylic acid or methacrylic acid.

3. The process of claim 1 wherein the base is ammonia, alkylamine, alkanolamine or an alkali metal hydroxide.

4. The process claim 1 wherein the amino group containing monomer is a water-soluble or a water-insoluble amino group containing monomer selected from the group consisting of tertiary-butylaminoethyl methacrylate, diethylaminoethyl methacrylate, dimethylaminoethyl methacrylate.

* * * * *